United States Patent [19]

Chambers et al.

[11] 4,289,221
[45] Sep. 15, 1981

[54] HYDRAULIC CONTROL SYSTEM

[75] Inventors: J. Bruce Chambers, Yardley, Pa.; Richard J. Dotter, Sr., Trenton, N.J.

[73] Assignee: Eaton Corporation, Cleveland, Ohio

[21] Appl. No.: 961,891

[22] Filed: Nov. 17, 1978

[51] Int. Cl.³ .............................................. F16D 25/10
[52] U.S. Cl. ................................ 192/3.57; 192/87.13; 192/109 F
[58] Field of Search .................. 192/3.27, 3.57, 109 F, 192/12 C, 13 R, 48.7, 51, 87.13, 87.14, 87.17, 87.19, 4 A; 137/489

[56] References Cited

U.S. PATENT DOCUMENTS

| | | | |
|---|---|---|---|
| 3,820,417 | 6/1974 | Allen et al. | 192/3.57 |
| 3,831,725 | 8/1974 | Schott | 192/3.27 |
| 3,948,146 | 4/1976 | Maurer et al. | 192/109 F |
| 3,985,063 | 10/1976 | Lemon | 192/109 F |
| 4,020,934 | 5/1977 | Eichinger et al. | 192/109 F |
| 4,046,162 | 9/1977 | Rodeghiero | 192/109 F |

FOREIGN PATENT DOCUMENTS 1454721  11/1976  United Kingdom ............ 192/109 F Primary Examiner—George H. Krizmanich
Attorney, Agent, or Firm—R. J. McCloskey; F. M. Sajovec, Jr.

[57] ABSTRACT

A control system for use with dependent hydraulic clutches in which an accumulator valve (22) is used to provide improved engagement characteristics for the hydraulic clutch assembly (10). The accumulator valve includes back-to-back pistons (96, 100) separated by an outer spring (102) and an inner spring (104). Movement of the pistons provides an initial fast fill of the clutches, followed by a period of cushioned engagement, and then complete engagement. The dual spring arrangement provides two distinct periods of cushioned engagement.

9 Claims, 3 Drawing Figures

HYDRAULIC CONTROL SYSTEM

The present invention relates to an apparatus for regulating the operation of hydraulically actuated clutches, and more particularly to apparatus for controlling the filling and engagement characteristics of a pair of dependent clutches used in a powershift transmission.

Various apparatus and systems have been devised to regulate the build up of pressure in hydraulic clutches. One known system uses one or more throttling valves in the hydraulic circuit between the pressure source and the clutches in order to restrict or limit the pressure build up. Another approach is to modify the clutch actuator so that only a portion of the piston thereof is initially exposed to hydraulic pressure, with the entire piston eventually being exposed in order to provide increased force to maintain the clutch in engagement.

Still another arrangement is to insert an accumulator between the pressure source and the clutches. An example of such an arrangement is disclosed in U.S. Pat. No. 3,985,063 to Lemon, including an accumulator having a piston, wherein the piston acts between an inactive position in which an initial rapid fill of the clutch is provided, and a stroked position in which full engagement pressure is applied to the clutch, the intermediate range of movement between fully destroked and fully stroked providing cushioned engagement.

When an accumulator system is used for two or more independent clutches in a powershift transmission, multiple accumulator systems can be used, or a system can be used wherein a single accumulator can serve more than one clutch.

When the powershift transmission includes clutches of the dependent type, that is a clutch arrangement in which one clutch must be emptied before a second clutch can be filled, the single piston accumulator, or a plurality of single piston accumulators will not provide the desired clutch engagement control.

Accordingly, it is an object of the present invention to provide a system for regulating the operation of dependent hydraulic clutches, utilizing a piston type accumulator to control the flow of fluid to and the pressurization of the clutches. A further object of the invention is to provide an accumulator structure for use in such a system.

To meet the above objectives the present invention provides a fluid supply system for a plurality of dependent clutches incorporating an accumulator comprising a pair of pistons arranged back to back in a common bore with a pair of springs having different rates separating the two pistons. The first spring biases both pistons to their fully destroked positions, while the second spring, which is received concentrically within the first spring and which is somewhat shorter and of higher rate than the first spring, engages the pistons only during a portion of the piston stroke to define a secondary actuation cycle, and provide a more gradual and, therefore, smoother clutch engagement. This arrangement also has the effect of changing the effective rate of the main spring when flow is shifted from one clutch to the other, since one piston will be in a partially stroked position when its clutch is being emptied, thus partially compressing the main spring to increase its effective rate, and allow more time for the second clutch to fill while the first clutch is emptying.

Other features and advantages of the present invention will become apparent from the following detailed description in conjunction with the drawings, wherein.

Figure 1:
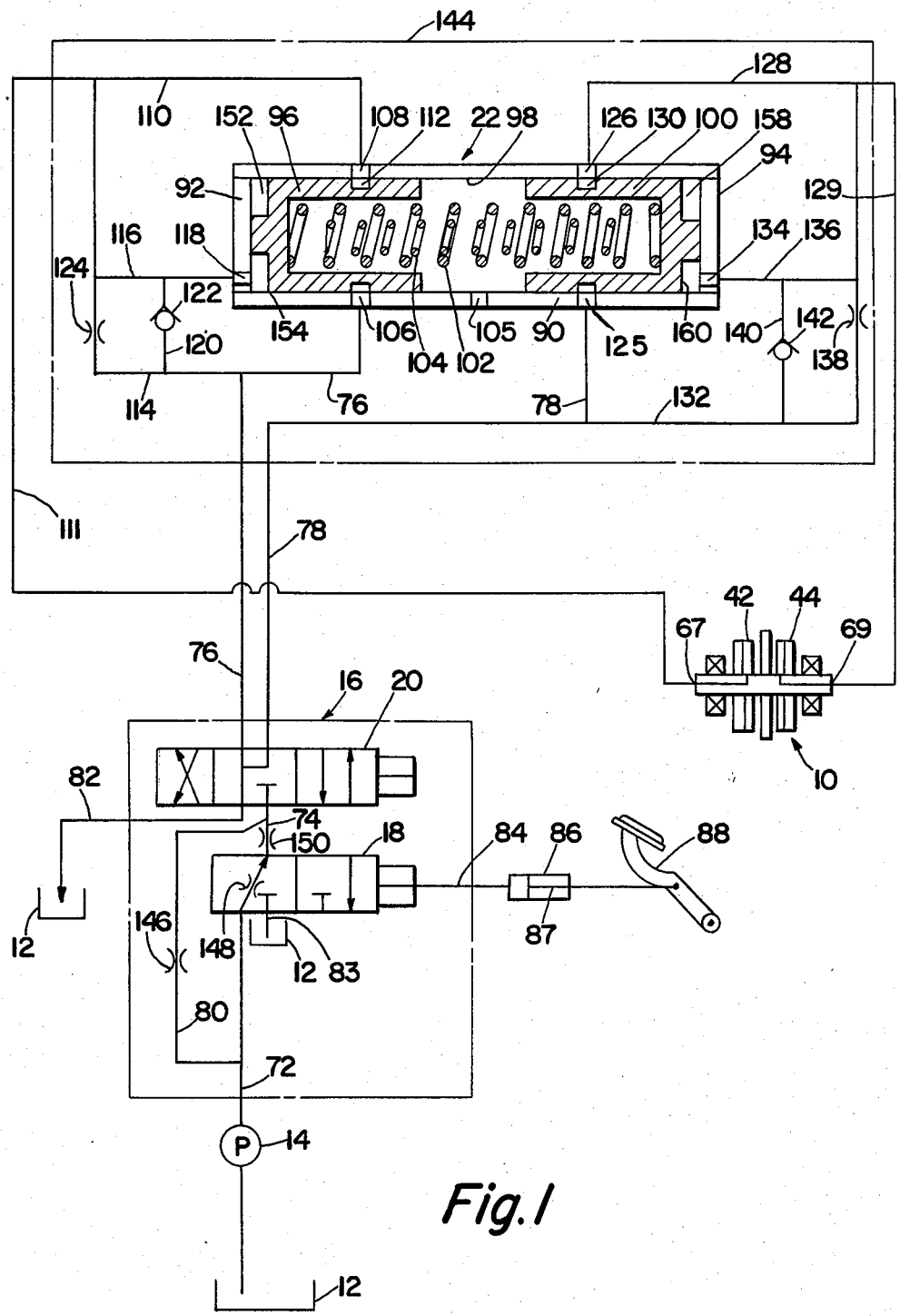
FIG. 1 is a schematic representation of a hydraulic clutch actuating system incorporating the invention.

Referring to FIG. 1, there is illustrated a hydraulic system for actuating a dependent clutch assembly 10 in a powershift transmission of an industrial truck. The system comprises a sump or reservoir 12; a pump 14 which can be driven by the vehicle engine; a control valve 16 which includes an inching valve 18, and a shift valve 20; and an accumulator valve 22.

Figure 2:
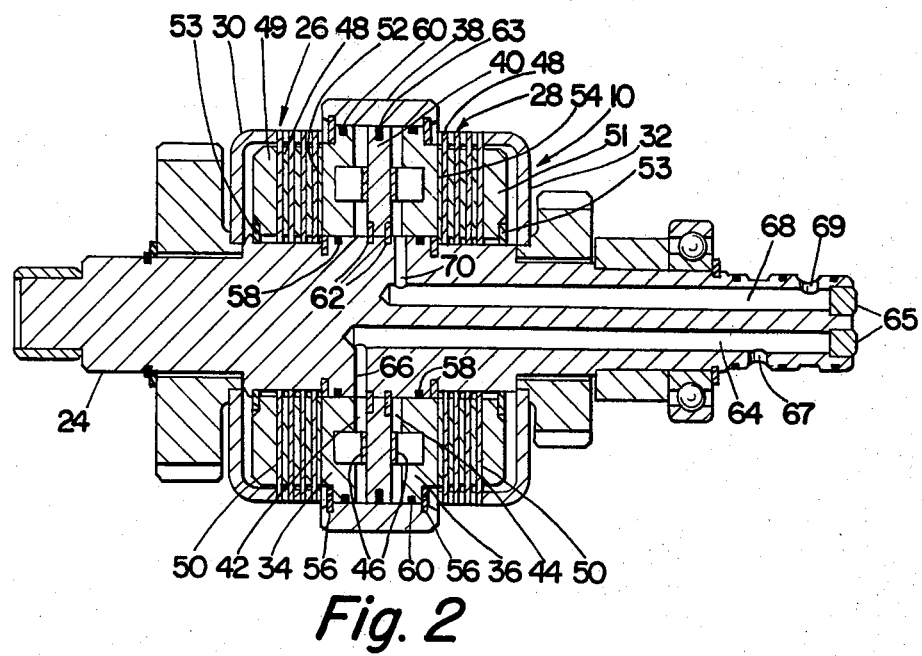
FIG. 2 is a partial sectional view of a dependent clutch assembly controlled by the system of FIG. 1.

Referring to FIG. 2, the clutch assembly 10 comprises a pair of dependent clutch units 26 and 28, including clutch output members 30 and 32, actuating pistons 34 and 36, a cylinder member 38 connecting the pistons 34 and 36, a center plate member 40 which defines hydraulic fluid chambers 42 and 44 behind pistons 34 and 36, and wave springs 46 acting between the plate 40 and the pistons 34 and 36.

The dependent clutch units 26 and 28 are of the well-known multiple disk type in which in each unit a plurality of input disks 48 are splined or otherwise fastened to the input shaft 24 and are interleaved with a plurality of output disks 50 which are fastened to the output members 30, 32. Backing plates 49 and 51 retained by rings 53 are splined to the input shaft 34. The actuating pistons 34, 36 are slidably received on the input shaft 24 and include clutch plate engagement faces 52 and 54, respectively. The cylinder member 38 is slidably received over the pistons 34, 36 and restrains the pistons from outward movement relative thereto by means of retaining rings 56. Seals 58 are provided between the pistons and the input shaft 24, and seals 60 are provided between the pistons and the cylinder member 38.

The central plate 40 is slidably received on the input shaft 24 and within the actuating ring 38 and is retained axially on the shaft by means of retaining rings 62. A seal 63 is provided between the plate 40 and the actuating ring 38. Wave springs 46 act between the plate 40 and the pistons 34, 36 to maintain the pistons in the position shown when the clutch is not energized.

A first axial bore 64 formed in the input shaft 24 intersects with a first radial bore 66 opening into the first chamber 42 to conduct pressurized hydraulic fluid to the chamber 42 to engage the first clutch unit 26. A second axial bore 68 intersects a second radial bore 70 opening into the second chamber 44 to conduct pressurized hydraulic fluid to the second clutch unit 32. The axial bores 64 and 68 are closed at their ends by plug members 65, and inlet ports 67 and 69 are provided in axial bores 64 and 68, respectively, for connection to the hydraulic control system.

In the illustrative embodiment, the clutch 10 is part of a powershift transmission for an industrial truck, and engagement of the first clutch unit 26 puts the transmission in a forward drive mode, while engagement of the second clutch unit 28 puts the transmission in a reverse drive mode. It can be appreciated that with appropriate gearing the clutch units 26 and 28 could be used to select two forward speeds or two reverse speeds.

When the control system illustrated in FIG. 1 is shifted to a forward mode, as will be described later, fluid flow is directed through the inlet port 67 to the bores 64 and 66 to fill chamber 42. Once the chamber is filled and pressure builds up therein, piston 34 moves to the left as shown, to engage the first clutch unit 26 in a known manner. As piston 34 moves to the left, piston 36 also moves to the left since the pistons are interconnected by means of the cylinder member 38 and the retaining rings 56. When the system is shifted directly from the forward mode to the reverse mode, fluid is directed to the chamber 44 via the inlet port 69 and the bores 68 and 70. At the time the shift is made, it must be appreciated that the piston 36 is in a leftward position, such that before chamber 44 can be filled, the chamber 42 must be partially emptied to return piston 34 to the position shown in FIG. 2. Once this has been accomplished, the chamber 44 can be filled and piston 36 moved to the right (along with piston 34 as described above) to engage the second clutch unit 28.

The dependent action of the clutch units 26 and 28 brings about certain engagement characteristics which are unique to this type of clutch assembly, and which the accumulator valve assembly 22 illustrated in FIG. 1 is designed to accommodate.

Referring to FIG. 1, the control valve 16 comprises an inlet conduit 72 connecting the inching valve 18 with the outlet of the pump 14; the inching valve 18, which is normally biased to the position shown; a conduit 74 connecting the inching valve to the shift valve 20; the shift valve 20, which is normally in the neutral position illustrated; first and second outlet conduits 76, 78 connecting the control valve to the accumulator valve 22; an internal conduit 80 connecting conduits 72 and 74 to bypass the inching valve 18; and drain conduits 82 and 83 extending to the sump 12. A line 84 connects the inching valve 18 with a hydraulic brake cylinder 86 actuated by the vehicle service brake pedal 88.

The accumulator valve 22 comprises a cylindrical valve body 90, end caps 92 and 94 closing the ends of the valve body, a first portion 96 received in a bore 98 of the valve body 90, a second piston 100 received in the bore 98, a first spring 102 acting between the first and second pistons, a second spring 104 which is somewhat shorter than the first spring and is received within the first spring, and a central vent port 105 formed through the body 90 to prevent pressure buildup between the pistons.

The first outlet conduit 76 from the control valve 16 is connected to a first inlet port 106 formed in the valve body 90. A first outlet port 108 is formed in axial alignment with the port 106 and is connected to a first clutch outlet conduit 110. A circumferential groove 112 is formed in the first piston 96, and serves to connect the ports 106 and 108 when the piston 96 is in the position shown.

A conduit 114 connects the conduits 76 and 110, bypassing the valve 22, and a pilot conduit 116 connects the conduit 114 with a pilot port 118 formed in the end cap 92. A line 120 having a check valve 122 connected therein is connected between the pilot conduit 116 and the conduit 114. An orifice 124 is connected in conduit 114.

The right hand side of the accumulator valve 22 is identical to the left side as shown in FIG. 1, and includes a second inlet port 125 to which outlet conduit 78 is connected, second outlet port 126, a second clutch outlet conduit 128, a circumferential groove 130 formed in the piston 100, a conduit 132 connecting conduits 78 and 128, a second pilot port 134, a second pilot conduit 136, an orifice 138, and a conduit 140 including a check valve 142 connecting pilot conduit 136 and conduit 128.

It can be appreciated that the illustration of the accumulator valve in FIG. 1 is schematic, and that in actual practice the orifices 124 and 138, the check valves 122 and 142, and their associated conduits may be included in a single valve body as represented by the dashed line 144.

When the industrial vehicle is to be operated at a standstill, the control valve 16 will be in the position shown in FIG. 1, with the shift valve 20 in a neutral position. In the neutral condition oil flow from the pump 14 will be directed to a clutch lubricating circuit, to other hydraulic components, and back to sump in a conventional manner via lines which, for reasons of simplicitiy, are not shown on FIG. 1.

When the vehicle is to be operated in the forward mode, the shift valve 20 is moved to the right directing pump flow through the inching valve 18 and shift valve 20 to first outlet conduit 76. The bypass conduit 80 includes an orifice 146 which has a diameter on the order of 1.00 mm, while the inching valve 18 includes an internal orifice 148 having a diameter on the order of 2.00 mm. and the conduit 74 includes an orifice 150 having a diameter on the order of 3.00 mm. Accordingly, fluid flow will normally be through the inching valve 18 rather than through the bypass 80.

Figure 3:
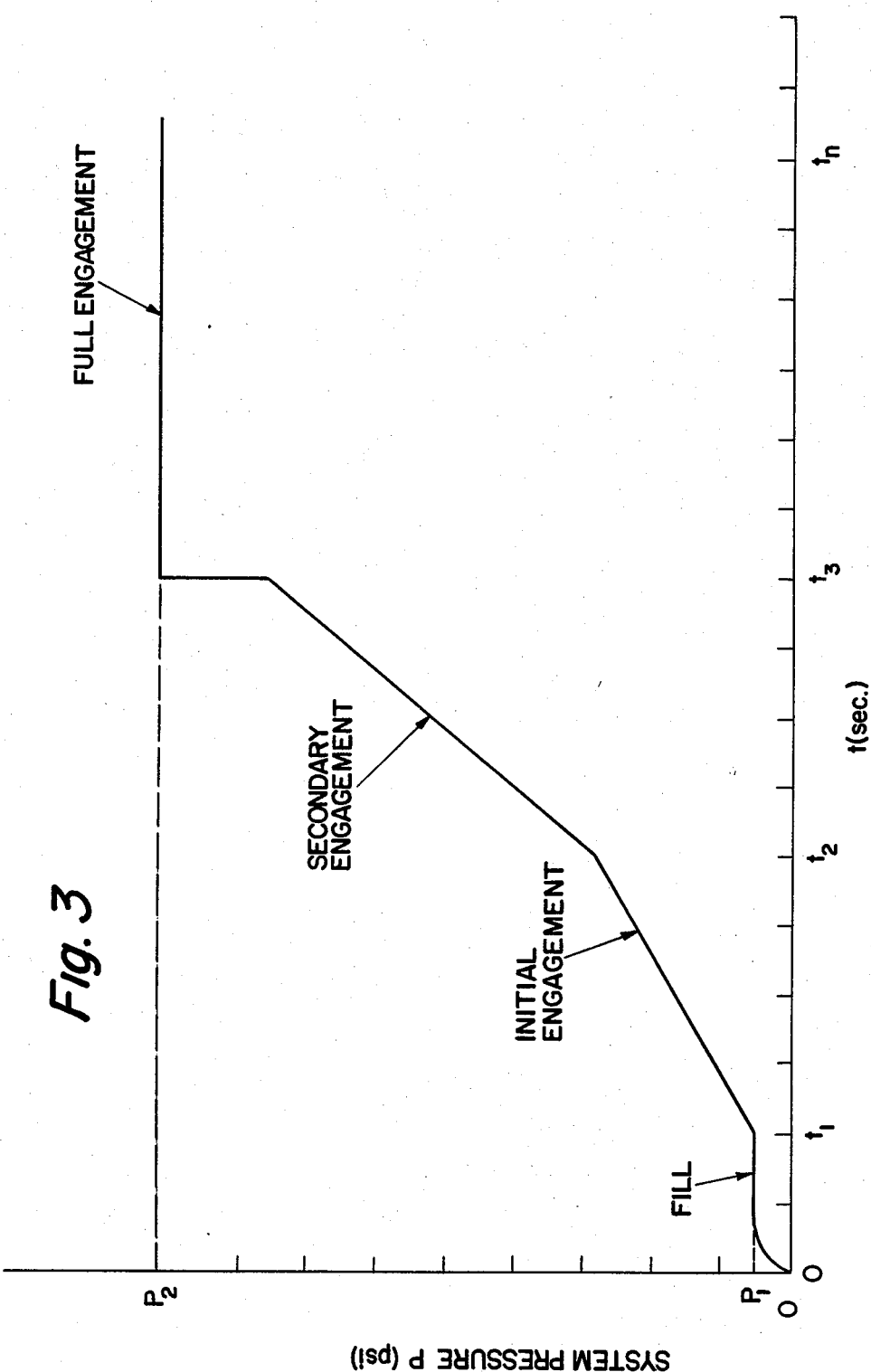
FIG. 3 is a graph showing a pressure-time relationship for the clutch assembly of FIG. 2.

When conduit 76 is first pressurized, the accumulator valve will be in the position shown in FIG. 1, with the groove 112 in first piston 96 in alignment with ports 106 and 108, providing essentially unrestricted flow to the first clutch unit 26 via conduit 110 and conduit 111 which communicates with the inlet port 67 in the clutch input shaft 24. Referring to FIG. 3, as fluid flows through axial bore 64 and radial bore 66 into the chamber 42, there will be little increase in pressure in the conduit 76 until the chamber is completely filled, as indicated by the fill phase of a typical clutch actuation cycle between time $t_o$ and time $t_1$.

Once the chamber 42 is filled, pressure builds up in conduit 76, and is sensed, via conduits 114 and 116, at the pilot port 118. As pressure builds up in chamber 152 defined by the end cap 92 and the end of piston 96, the piston 96 will begin moving to the right against spring 102 only, gradually restricting flow through conduit 110 as the groove 112 moves out of alignment with the ports 106 and 108. When the ports 106 and 108 become completely closed off by the piston 96, flow to the clutch unit 26 will be via conduits 76, 114 through orifice 124, and 111.

As pressure builds up in clutch chamber 42, clutch piston 34 will move to the left to engage the first clutch unit 26. Since flow is restricted by the orifice 124 during this phase of the clutch engagement cycle, pressure build up, therefore, clutch engagement will be gradual, as illustrated in FIG. 3 as the initial engagement phase of the engagement cycle between time $t_1$ and time $t_2$.

As pressure builds up in chamber 152 of the accumulator valve, and piston 96 continues to move to the right, the ports 106 and 108 will again be uncovered as the left hand edge 154 of the piston passes the ports. To insure that the ports will be uncovered gradually to further cushion the engagement of the clutch, the second spring 104, which is of higher rate than the first spring 102, is sized such that it is engaged by the piston 96 just as the edge 154 comes into alignment with the ports 106, 108. As the ports 106 and 108 open, flow to the clutch will again be via conduit 110; however, since movement of the piston 96 to the right is now resisted by both springs 102 and 104, the pressure buildup in clutch chamber 42 will still be gradual, although at a somewhat higher rate than the initial engagement phase, as shown in FIG. 3, by the secondary engagement phase between time $t_2$ and time $t_3$.

Once piston 96 completely passes the ports 106 and 108, unrestricted flow is permitted through conduit 110 and full engagement pressure is applied to the clutch as illustrated in FIG. 3 as the full engagement phase between time $t_3$ and time $t_n$.

When the vehicle is to be shifted from the forward mode to a reverse mode, the shift valve 20 is moved to the left directing pump flow through the inching valve 18 and shift valve 20 to the second outlet conduit 78. When conduit 78 is first pressurized, the second piston 100 of the accumulator valve will be in the position shown in FIG. 1, with groove 130 aligned with ports 125 and 126, providing essentially unrestricted flow to the second clutch unit 28 via conduit 128 and conduit 129 which communicates with the inlet port 69 in the clutch input shaft 24. With reference to FIG. 2, it should be noted that when the clutch assembly is shifted directly from forward to reverse the second clutch piston 36 is initially displaced to the left by means of its interconnection with the first piston through the cylinder member 38; therefor, the second clutch unit 28 will not be filled and engaged until the fluid in the first clutch chamber 42 is exhausted.

Referring to FIG. 1, when shift valve 20 is moved to the left, fluid in the first clutch chamber 42 is directed to the sump 12 via conduits 111, 114, 116, 120 via check valve 122, conduit 76 to the valve 20, and conduit 82 to the sump 12. As chamber 42 empties, and chamber 44 fills, the pressure in chamber 152 will decrease and piston 96 will return to its FIG. 1 position.

When chamber 44 is filled, pressure builds up in conduit 78 and is sensed via conduits 132 and 136, at the pilot port 134. As pressure builds up in the chamber 158 defined by the end cap 94 and the end of piston 100, the piston 100 will move to the left against spring 102, gradually restricting flow through conduit 128 as the groove 130 moves out of alignment with the ports 125 and 126. When the ports 125 and 126 become completely closed off by the piston 100, flow to the clutch unit 28 will be via conduits 78, 132 through orifices 138, and 129.

It is expected that piston 96 will not return completely to its FIG. 1 position until filling of clutch chamber 44 has been completed and initial engagement of clutch unit 28 has begun; therefore, there will initially be an additional preload on spring 102, delaying movement of piston 100 to the left and delaying engagement of the clutch unit 28 to provide an additional cushioning effect in shifting from forward to reverse.

As pressure builds up in chamber 158 and piston 100 continues to move to the left, the ports 125 and 126 will again be uncovered as the right hand edge 160 of the piston passes the ports. As the edge comes into alignment with the ports, second spring 104 comes into effect as described above with respect to piston 96, insuring a gradual buildup in pressure in clutch chamber 44 as illustrated in FIG. 3 by the secondary engagement phase between time $t_2$ and time $t_3$.

Once piston 100 completely passes the ports 125 and 126, unrestricted flow is permitted through line 128 and full engagement pressure is applied to the clutch unit 28.

When shift valve 20 is then moved to its neutral position or to its forward position, chamber 44 will drain to the sump 12 via conduits 129, 132 and 136, 140 via check valve 142, conduit 78 to valve 20, and conduit 82 to the sump 12.

When it is desired to put the vehicle into an inching mode, wherein it is necessary to slip the clutch while full hydraulic pressure is applied to hydraulic lift and tilt cylinders and the like, brake pedal 88 is actuated, moving the brake piston 87 to the left as shown in FIG. 1, and pressurizing an actuating piston (not shown) within inching valve 18 to move the inching valve to the left as shown in FIG. 1. In this position most of the flow to the control valve 16 is diverted to the sump 12 via conduits 80 and 83 thus limiting the engaging pressure that can be applied to the clutches via conduits 76 and 78.

When the inching mode is selected the shift valve 20 can be in the neutral position shown in FIG. 1, and then shifted to first or second speed with the brake pedal 88 depressed and the inching valve 18 moved to the left. In this mode, flow to the selected clutch unit will be restricted, and full engagement pressure P2 as shown on FIG. 3 will not be obtained. Because of the restricted flow, filling of the clutch and movement of the piston 96 or 100 of the accumulator valve will be relatively slow such that the ultimate engagement pressure of the clutches will be achieved gradually, which is very desirable when operating in the inching mode.

We claim:

1. In a control system for actuating a pair of dependent hydraulic clutches, said clutches comprising a first clutch piston, means defining a first pressure chamber behind said first clutch piston, a second clutch piston, means defining a second pressure chamber behind said second clutch piston, and means connecting said first and second clutch pistons whereby both clutch pistons move in response to pressurization of either of said first and second pressure chambers; a source of pressurized hydraulic fluid; a shift valve operable to selectively connect said source with said first and second pressure chambers, an accumulator valve assembly operable to control the flow of pressurized hydraulic fluid from said shift valve to said first and second pressure chambers; and conduit means connecting said source to said shift valve, said shift valve to said accumulator valve and said accumulator valve to said first and second chambers; the improvement wherein said accumulator valve assembly comprises a valve body; a first accumulator piston received within said valve body for controlling fluid flow to said first pressure chamber; a second accumulator piston received within said valve body for controlling fluid flow to said second pressure chamber, said first and second accumulator pistons being disposed in back-to-back relationship within a cylindrical bore formed in said valve body; means defining first and second inlet ports formed through said valve body into said cylindrical bore; means defining first and second outlet ports formed through said valve body into said cylindrical bore; means formed on said first accumulator piston for connecting said first inlet and outlet ports when said first accumulator piston is in a first position, for blocking flow between said first inlet and outlet ports when said first accumulator piston is in a second position, and for reconnecting said first and second inlet and outlet ports when said first accumulator piston is in a third position; means formed on said second accumulator piston for connecting said second inlet and outlet ports when said said accumulator piston is in a second position, for blocking flow between said second inlet and outlet ports when said second accumulator piston is in a second position, and for reconnecting said second inlet and outlet ports when said second accumulator piston is in a third position; and a first spring received between said first and second accumulator pistons to bias said pistons apart in said bore; said system including first and second inlet conduit means connecting said shift valve with said first and second inlet ports respectively, first outlet conduit means connecting said first outlet port with said first clutch pressure chamber, and second outlet conduit means connecting said second outlet port with said second clutch pressure chamber.

2. Apparatus as claimed in claim 1, including a second spring received between said first and second accumulator pistons, said second spring being shorter than said first spring whereby said second spring is contacted by said first and second accumulator pistons only after one or both of said first and second accumulator pistons has moved a sufficient distance to compress said first spring by a predetermined amount.

3. Apparatus as claimed in claim 2, in which said first and second springs are coil springs, said second spring is received within said first spring, and said second spring is of higher rate than said first spring.

4. Apparatus as claimed in claim 1, including bypass conduit means connecting said first inlet and outlet conduits.

5. Apparatus as claimed in claim 4, including a first pilot chamber defined by said first accumulator piston and a first end wall of said cylindrical bore, means defining a first pilot port opening into said first pilot chamber, and first pilot conduit means connecting said first pilot port with said first bypass conduit.

6. Apparatus as claimed in claim 1 including bypass conduit means connecting said second inlet and outlet conduits.

7. Apparatus as claimed in claim 1 including a second pilot chamber defined by said second accumulator piston and a second end wall of said cylindrical bore, means defining a second pilot port opening into said second pilot chamber, and second pilot conduit means connecting said second pilot port with said second bypass conduit.

8. Apparatus as claimed in claim 1 in which said means formed on each of said first and second accumulator pistons for connecting said inlet and outlet ports when said accumulator piston is in a second position comprises a circumferential groove formed in said piston, and said third position of each of said accumulator pistons is defined by the passage of an edge of said piston past said inlet and outlet ports.

9. Apparatus as claimed in claim 8, including a flow restricting element in each of said first and second bypass conduits, and a check valve connected in parallel with each of said flow restricting elements, said check valves permitting substantially unrestricted flow therethrough in a direction from said clutch pressure chambers to said shift valve and shutting off flow therethrough in the opposite direction.

* * * * *